United States Patent
Haeupler

(10) Patent No.: US 9,686,221 B2
(45) Date of Patent: Jun. 20, 2017

(54) ERROR CORRECTION FOR INTERACTIVE MESSAGE EXCHANGES USING SUMMARIES

(71) Applicant: Microsoft Corporation, Redmond, WA (US)

(72) Inventor: Bernhard Haeupler, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 363 days.

(21) Appl. No.: 14/341,513

(22) Filed: Jul. 25, 2014

(65) Prior Publication Data
US 2016/0028679 A1    Jan. 28, 2016

(51) Int. Cl.
| | | |
|---|---|---|
| G06F 15/16 | (2006.01) | |
| H03M 13/00 | (2006.01) | |
| H04L 29/06 | (2006.01) | |
| H04L 12/58 | (2006.01) | |
| G06Q 10/10 | (2012.01) | |

(52) U.S. Cl.
CPC ........... H04L 51/30 (2013.01); G06Q 10/107 (2013.01); H04L 63/0428 (2013.01)

(58) Field of Classification Search
CPC ..... G06Q 10/107; H04L 12/585; H04L 12/58; H04L 12/581; H04L 12/5855; H04L 63/04; H04L 63/08; H04L 63/0428; H04L 29/06; H03M 13/2957; H03M 13/45; H03M 1/0045; H03M 13/1111; H03M 13/1102
USPC ....................................................... 709/206
See application file for complete search history.

(56) References Cited

U.S. PATENT DOCUMENTS

| | | | |
|---|---|---|---|
| 7,805,656 B2 | 9/2010 | Jiang | |
| 8,069,402 B2 | 11/2011 | Myers et al. | |
| 8,141,152 B1* | 3/2012 | Hwang | H04L 51/12 370/242 |
| 8,327,234 B2* | 12/2012 | Earnshaw | H03M 13/1505 714/780 |
| 8,358,705 B2 | 1/2013 | Shelby et al. | |
| 8,522,121 B2* | 8/2013 | Zopf | H03M 13/09 714/785 |

(Continued)

OTHER PUBLICATIONS

"HMACSHA256 Class", Published on: May 8, 2012 Available at: http://msdn.microsoft.com/en-us/library/system.security.cryptography.hmacsha256%28v=vs.110%29.aspx.

(Continued)

*Primary Examiner* — Mahran Abu Roumi
(74) *Attorney, Agent, or Firm* — Jonathan M. Waldman

(57) ABSTRACT

In a conversation between a first computing device and a second computing device over a communication channel, each computing device keeps a transcript of the messages that have been sent and received by that computing device. After a threshold number of messages have been sent and received by the devices, each device transmits a summary of the messages sent and received by that device to the other device. If the summaries match, then the messages were sent and received successfully by each device, and the devices can continue to exchange messages until the threshold number of messages is reached again. If the summaries do not match, the devices can roll-back a part of the conversation and the transcript and continue covered by the summaries and continue from there.

18 Claims, 7 Drawing Sheets

(56) References Cited

U.S. PATENT DOCUMENTS

| | | | | |
|---|---|---|---|---|
| 9,444,795 B1* | 9/2016 | Kowalski | ............ | H04L 63/0428 |
| 2002/0062443 A1* | 5/2002 | Lim | ...................... | H04L 9/3268 |
| | | | | 713/178 |
| 2002/0178410 A1* | 11/2002 | Haitsma | ............ | G06F 17/30787 |
| | | | | 714/709 |
| 2003/0188160 A1* | 10/2003 | Sunder | ...................... | G06F 8/65 |
| | | | | 713/165 |
| 2010/0011072 A1* | 1/2010 | Mishchenko | .......... | G06Q 10/10 |
| | | | | 709/206 |
| 2010/0223534 A1* | 9/2010 | Earnshaw | ......... | H03M 13/1505 |
| | | | | 714/780 |
| 2010/0250951 A1* | 9/2010 | Ueno | .................... | H04L 9/0844 |
| | | | | 713/176 |
| 2010/0325519 A1 | 12/2010 | Lyon | | |
| 2011/0208816 A1* | 8/2011 | Chavez | ................ | G06Q 10/107 |
| | | | | 709/206 |
| 2011/0209029 A1* | 8/2011 | Zopf | ..................... | H03M 13/09 |
| | | | | 714/758 |
| 2011/0305179 A1* | 12/2011 | Wang | .................... | H04L 1/0031 |
| | | | | 370/311 |
| 2013/0197859 A1* | 8/2013 | Albano | ............... | G06K 9/00369 |
| | | | | 702/150 |
| 2013/0290655 A1* | 10/2013 | Fang | ................. | G06F 17/30377 |
| | | | | 711/156 |
| 2014/0029701 A1* | 1/2014 | Newham | ................. | H04L 7/041 |
| | | | | 375/340 |
| 2014/0143155 A1* | 5/2014 | Karlov | ................ | G04G 99/006 |
| | | | | 705/71 |
| 2014/0258813 A1* | 9/2014 | Lusted | .................... | H04L 1/004 |
| | | | | 714/776 |
| 2014/0337614 A1* | 11/2014 | Kelson | ................. | H04L 63/168 |
| | | | | 713/152 |
| 2015/0379008 A1* | 12/2015 | Reiss | ................ | G06F 17/30368 |
| | | | | 707/693 |
| 2015/0379114 A1* | 12/2015 | Onishi | .................... | G06F 13/00 |
| | | | | 707/737 |
| 2016/0247157 A1* | 8/2016 | Yang | ....................... | H04L 51/32 |

OTHER PUBLICATIONS

Schulman, Leonard J., "Communication on Noisy Channels: A Coding Theorem for Computation", In Proceedings of 33rd Annual Symposium on Foundations of Computer Science, Oct. 24, 1992, 10 pages.

Braverman, et al., "Information Equals Amortized Communication", In Proceedings of the 2011 IEEE 52nd Annual Symposium on Foundations of Computer Science, Jun. 21, 2011, 21 pages.

Brakerski, et al., "Efficient Interactive Coding against Adversarial Noise", In IEEE 53rd Annual Symposium on Foundations of Computer Science, Oct. 20, 2012, 7 pages.

Kol, et al., "Interactive channel capacity", In Proceedings of the forty-fifth annual ACM symposium on Theory of computing, Jun. 1, 2013, 67 pages.

Schulman, Leonard J., "Coding for interactive communication", In IEEE Transactions on Information Theory, vol. 42, Issue 6, Nov. 1996, 20 pages.

Braverman, et al., "Towards coding for maximum errors in interactive communication", In Proceedings of the forty-third annual ACM symposium on Theory of computing, Jun. 6, 2011, 11 pages.

Gelles, et al., "Efficient and explicit coding for interactive communication", In IEEE 52nd Annual Symposium on Foundations of Computer Science, Oct. 22, 2011, 13 pages.

Brakerski, et al., "Fast Algorithms for Interactive Coding", In Proceedings of the Twenty-Fourth Annual ACM-SIAM Symposium on Discrete Algorithms, Jan. 6, 2013, 20 pages.

Braverman, Mark, "Coding for Interactive Computation: Progress and Challenge", In Proceedings of 50th Annual Allerton Conference on Communication, Control, and Computing, Oct. 1, 2012, 8 pages.

Braverman, et al., "List and unique coding for interactive communication in the presence of adversarial noise", In Proceedings of Electronic Colloquium on Computational Complexity, vol. 21, Retrieved on: May 26, 2014, 39 pages.

Franklin, et al., "Optimal coding for streaming authentication and interactive communication", In Proceedings of 33rd Annual Cryptology Conference, vol. 8043, Aug. 18, 2013.

Ghaffari, et al., "Optimal Error Rates for Interactive Coding II: Efficiency and List Decoding", In Proceedings of the Computing Research Repository, Dec. 2013, 44 pages.

Ghaffari, et al., "Optimal Error Rates for Interactive Coding I: Efficiency and List Decoding", In Proceedings of the Computing Research Repository, Dec. 2013, 32 pages.

Naor, et al., "Small-bias Probability Spaces Efficient Constructions and Applications", In SIAM Journal on Computing, vol. 22, Issue 4, Published on: Aug. 1993, 28 pages.

Peleg, David, "Distributed Computing: A Locality-Sensitive", Published on: Sep. 2000, 1 page. Available at: http://www.cambridge.org/am/academic/subjects/computer-science/distributed-networked-and-mobile-computing/distributed-computing-locality-sensitive-approach.

* cited by examiner

ERROR CORRECTION FOR INTERACTIVE MESSAGE EXCHANGES USING SUMMARIES

BACKGROUND

Channel coding is a popular technique for detecting and correcting errors in one-way communications in which information is transferred from a sender to a receiver. In channel coding, error correcting codes are used by a sender to transform a message to be sent into a codeword which is then sent to a receiver. If no error occurs in the transmission the receiver can recover the original message. If some limited amount of errors, occur the receiver can use redundancy added to the codeword to detect that errors have occurred. In some circumstances, it is also possible to correct the determined errors.

The performance guarantees of error correcting codes do not extend to two-way or interactive communications in which two or more parties engage in message exchanges which later messages are highly dependent on earlier messages of another party. The exchange of many small messages makes the use of error correcting codes inefficient, and a single corrupted message can derail an entire conversation.

SUMMARY

In a conversation between a first computing device and a second computing device over a communication channel, each computing device keeps a transcript of the messages that have been sent and received by that computing device. After some agreed upon threshold number of messages have been sent and received by the devices, each device transmits a summary of its current transcript. If the summaries match at a device, then the device determines that its current transcript is correct and all messages listed in the transcript were sent and received successfully by each device, and the devices continue with the conversation until the threshold number of messages is reached again. If the summaries do not match at a device, then errors have occurred and have been detected and the devices try to correct them by rolling-back to an earlier state of the conversation indicated in the transcript. It will continue from there until the threshold number of messages is reached again and another check of correctness is performed. The threshold number of messages can be set based on an amount of error observed in the channel.

In an implementation, a first plurality of messages is sent by a first computing device to a second computing device. A second plurality of messages is received by the first computing device from the second computing device. A first transcript of the first plurality of messages and the second plurality of messages is maintained by the first computing device. This is repeated until a threshold number of messages have been exchanged. A first summary of the first transcript is generated by the first computing device and sent to the second computing device. A second summary of a second transcript is received by the first computing device from the second computing device. That the first summary equals the second summary is determined by the first computing device. In response to the determination that the first summary equals the second summary, it is determined by the first computing device that no errors are associated with the messages recorded in the first transcript and the message exchange continues until the threshold number of messages is reached again.

In an implementation, a first plurality of messages is sent by a first computing device to a second computing device. A second plurality of messages is received by the first computing device from the second computing device. This is repeated until a threshold number of messages have been exchanged. A first transcript of the first plurality of messages and the second plurality of messages is maintained by the first computing device. The first transcript has a plurality of positions, and each message of the first plurality of messages and the second plurality of messages is associated with a position of the plurality of positions of the first transcript. A summary of the first transcript is generated by the first computing device. A first sub-transcript is generated from the first transcript by the first computing device. The first sub-transcript includes positions of the first transcript up to a first meeting position. A summary of the first sub-transcript of the first transcript is generated by the first computing device. Both summaries are sent by the first computing device. A summary of a second transcript is received by the first computing device from the second computing device. A summary of a first sub-transcript of the second transcript is received by the first computing device from the second computing device. The first sub-transcript of the second transcript includes positions of the second transcript up to the first meeting position. It is determined that the summary of the first transcript does not equal the summary of the second transcript, by the first computing device. In response to the determination, the first computing device determines that at least one error is associated with the plurality of messages recorded in the first or second transcript. It is determined by the first computing device that the first sub-transcript of the first transcript equals the first sub-transcript of the second transcript. In response to the determination, the first computing device rolls-back the conversation and the first transcript to the first meeting position.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
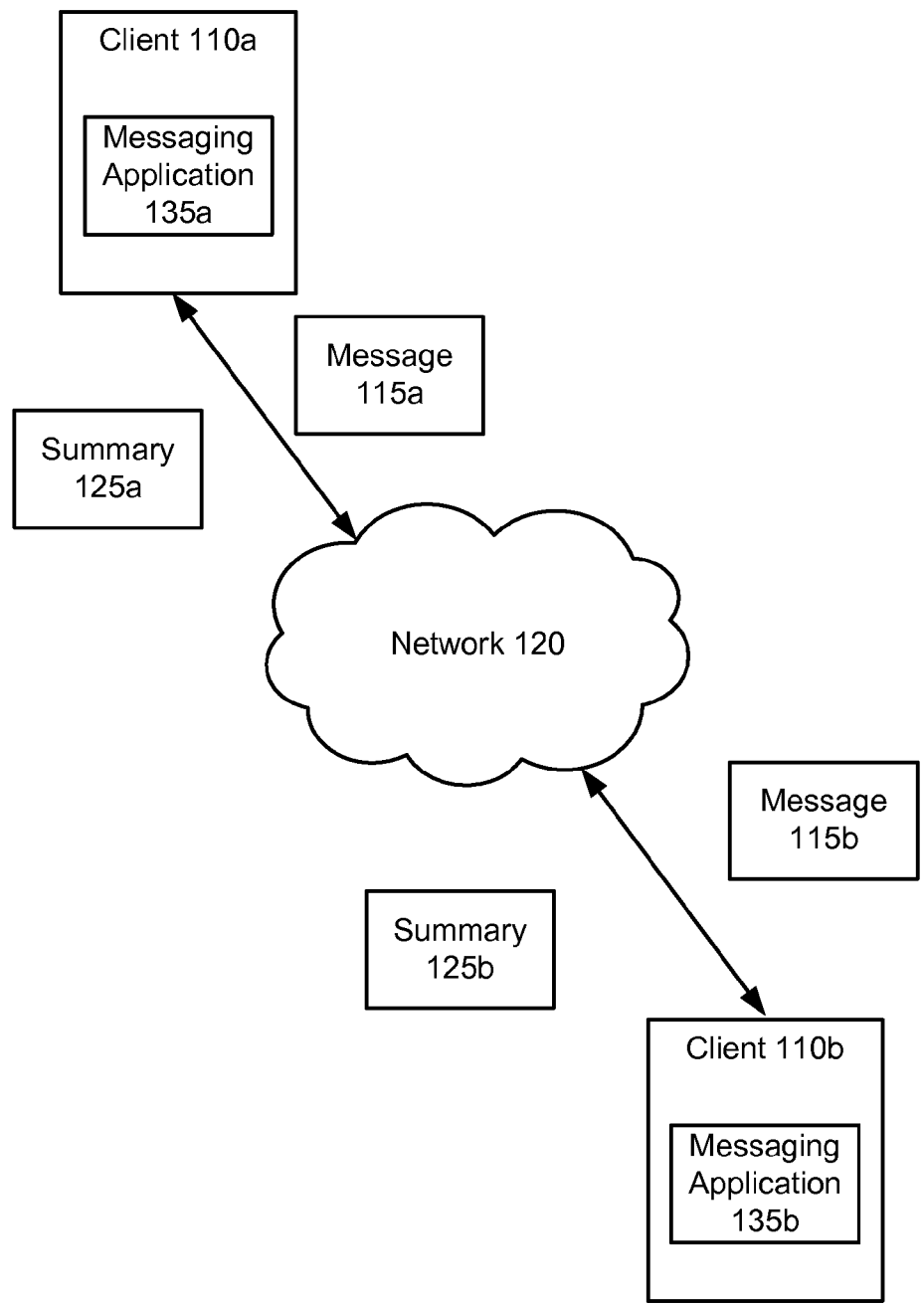
FIG. 1 is an illustration of an exemplary environment for performing an interactive exchange of messages, determining errors in one or more of the exchanged messages, and correcting the determined errors.

FIG. 1 is an illustration of an exemplary environment 100 for performing an interactive exchange of messages, determining errors in one or more of the exchanged messages, and correcting the determined errors. One or more clients 110 (e.g., the clients 110a and 110b) may communicate through a network 120 using messaging applications 135 (e.g., messaging applications 135a and 135b). The network 120 may be a variety of network types including the public switched telephone network (PSTN), a cellular telephone network, and a packet switched network (e.g., the Internet). Although two clients 110 and messaging applications 135 are shown in FIG. 1, there is no limit to the number of clients 110 and messaging applications 135 that may be supported.

In some implementations, the client 110 may include a desktop personal computer, workstation, laptop, personal digital assistant (PDA), smart phone, cell phone, or any WAP-enabled device or any other computing device capable of interfacing directly or indirectly with the network 120. The client 110 may be implemented using one or more computing devices such as the computing device 700 illustrated in FIG. 7.

The messaging application 135 may generate one or more messages 115 (e.g., messages 115a and 115b), and may exchange generated messages 115 with other messaging applications 135, forming a sequence of messages 115 or a conversation. In particular, the content of later messages may depend on earlier messages. The generated and exchanged messages 115 may include text messages such as emails, for example. The messages 115 may further include bits, or sequences of bits, such as bytes. Depending on the implementation, each message 115 may be the same size, or each message may be a different size. The messages 115 in a conversation may represent a sequence of instructions, such as a computer program, for example.

The clients 110 may exchange messages 115a and 115b through the network 120 through a channel. The channel may be associated with some amount of noise which may result in errors in one or more of the exchanged messages 115. The noise may for example include noise due to electrical currents, wireless interference, or message collisions. Such noise may be random or have more complex dependencies. In the absence of a good predictive model, the noise may be assumed to be adversarial. The noise may further include noise that is purposefully created by nefarious users to interfere with the exchange of the messages 115. Because the messages 115 are associated with a conversation, any errors in a message may affect all subsequent messages.

Accordingly, to overcome errors due to noise, the messaging applications 135 may periodically exchange what are referred to as summaries 125 (e.g., the summaries 125a and 125b). A summary 125 may be a summary of all of the messages 115 exchanged between two messaging applications 135 in a conversation or it may be a summary of a subset of these messages. It may also include additional auxiliary information such as the length of a transcript. The number of messages after which a summary 125 is transmitted may be a threshold value. Depending on the implementation, the exchanged summaries may include all messages exchanged since a previous summary was last exchanged, or may only include the most recently exchanged messages to reduce overhead due to summaries.

After the threshold number of messages 115 have been exchanged between the messaging applications 135, the messaging applications 135 may exchange summaries 125. If the summaries 125 exchanged by the messaging applications 135 are the same, then the messaging application 135 may determine that all of the messages 115 that are covered by the exchanged summaries 125 were received and sent with no errors. If the summaries 125 are not the same, then the messaging applications 135 may determine that there is an error in at least one of the messages 115 covered by the exchanged summaries 125.

When the summaries 125 are not the same, each messaging application 135 may roll-back the conversation to a previous point in time and continue the conversation from there, possibly resending some or all of the messages 115 that are covered by the exchanged summaries 125. The threshold value (e.g., the number of messages after which a summary 125 is created) may be agreed upon before the conservation begins, may be a default value, or may be based on the noise associated with the channel.

For example, the messaging application 135a and the messaging application 135b may begin a conversation and may agree on a threshold value of ten. After the messaging application 135a determines that a total of ten messages have been sent or received by the messaging applications 135a and 135b, the messaging application 135a may generate a summary 125a using the ten messages 115 (or some subset of the most recent messages), and may send the generated summary 125a to the messaging application 135b. The messaging application 135b may similarly generate and send a summary 125b based on the ten messages 115 that the messaging application 135b sent or received.

If the messaging application 135a determines that the summary 125a is the same as the summary 125b, then the messaging application 135a may determine that there were no errors in the previous messages 115 covered by the exchanged summaries 125, and may resume exchanging messages 115 with the messaging application 135b.

If the messaging application 135a determines that the summary 125a is not the same as the summary 125b, then the messaging application 135a may determine that there were errors in at least one of the previous messages 115 covered by the exchanged summaries 125. The messaging application 135a and 135b may each fix the determined errors by rolling-back the conversation to the beginning and start sending new messages 115 and building new summaries 125a and 125b.

The process may repeat after the next ten messages 115 have been exchanged with the transcripts and summaries 125 now covering all twenty messages 115. In this way, even if an error went undetected in the first ten messages 115 the messaging applications 135 can recover from any error in a message 115 by rolling-back multiple blocks of ten messages 115 one after another. When efficient summaries 125 are used, it can be guaranteed that the messaging application 135 can correct any error in a message 115 by sending at most a number of messages 115 proportional to the threshold value. As may be appreciated, the error recovery techniques described herein may be used with any additional error correcting techniques such as error correcting codes, which may reduce the amount of channel bandwidth or packet space that is lost to overhead associated with error correction.

Figure 2:
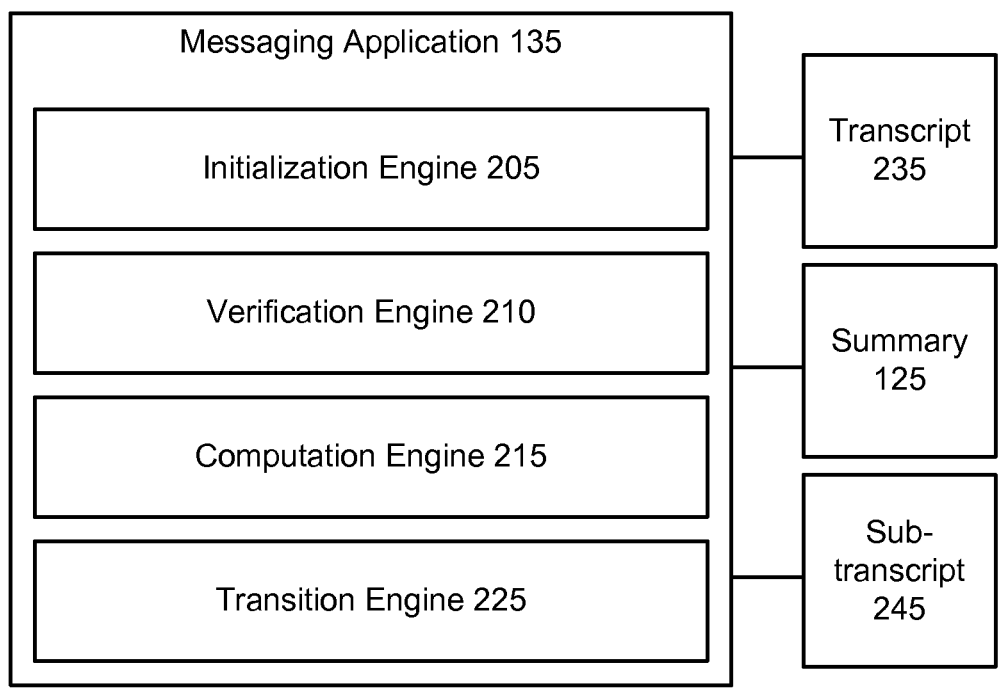
FIG. 2 is an illustration of an implementation of an exemplary messaging application.

As described further with respect to FIG. 2, the summary 125 may be a transcript. The transcript may be a list, or concatenation, of the messages 115 sent or received by a messaging application 135 since the last transcript was generated. The messages 115 in the transcript may be ordered based on when they were sent or received.

To conserve bandwidth, rather than exchanging the entire generated transcripts as the summaries 125, each messaging application 135a may generate a summary 125 from a transcript using a hash function. The hash function may include a variety of hash functions, and may be based on randomness that is exchanged or agreed upon by the messaging applications 135 before starting the conversation, or before each sequence of messages 115 of a length that is equal to the threshold value is exchanged.

FIG. 2 is an illustration of an implementation of an exemplary messaging application 135. The messaging application 135 may include one or more components including an initialization engine 205, a verification engine 210, a computation engine 215, and a transition engine 225. More or fewer components may be included in the messaging application 135. Some or all of the components of the messaging application 135 may be implemented by one or more computing devices such as the computing system 700.

The initialization engine 205 may perform one or more initialization steps before the messaging application 135 begins a conversation (e.g., sequence of messages 115) with another messaging application 135. The steps may include agreeing on a threshold value. The threshold value may be the maximum number of messages 115 that may be exchanged by the messaging applications 135 before the messaging applications 135 exchange summaries 125. In implementations where the threshold value is fixed, the initialization engine 205 may determine the threshold value by referencing a configuration file, for example. Other methods may be used.

In implementations where the threshold value is not fixed, the threshold value may be based on an amount of error $\epsilon$ associated with a channel that will be used to communicate by the messaging application 135. The error $\epsilon$ associated with a channel may be an error rate and may be determined by the initialization engine 205 by measuring channel conditions, such as noise, that are likely to cause communication errors. Any method for estimating an error rate of a communication channel may be used.

The threshold value may be inversely proportional to square root of the determined error $\epsilon$. When the determined error $\epsilon$ is low, few messages 115 with errors are expected. Therefore, a large number of messages 115 can be transmitted between summaries 125, and the threshold value may be high. Conversely, the when the determined error $\epsilon$ is high, frequent errors in messages 115 are expected. Therefore, few messages 115 can be transmitted between summaries 125, and the threshold value may be low.

A low threshold value results in more frequent summary 125 transmissions, and consequently more bandwidth of the channel is lost due to summaries. A high threshold value results in less frequent summary 125 transmissions; however, in the event that an error is detected, more messages 115 may have to be retransmitted. Accordingly, the threshold value may be selected by the initialization engine 205 to reduce bandwidth loss due to summaries 125, but also avoid excessive retransmission of messages 115 when errors are detected.

In addition to the threshold value, the initialization engine 205 may further select randomness that may be used to generate the summaries 125 transmitted during the conversation. The randomness may be a seed used by the hash function and may be a string or sequence of numbers. In some implementations, the randomness may be predetermined by the messaging application 135, and the initialization engine 205 may determine the randomness by referencing a configuration file, for example.

In implementations where the randomness is not predetermined, the initialization engine 205 of the messaging application 135 may determine the randomness based on randomness received from the other messaging application 135 that is participating in the conversation. The initialization engine 205 may use the received randomness as the randomness, or may partially use the received randomness.

For example, the initialization engine 205 may combine randomness generated by the initialization engine 205 with the randomness received from the messaging application 135 to generate an agreed combined randomness. Alternatively, the initialization engine 205 of the messaging applications 135 taking part in the conversation may alternate determining the randomness, the initialization engine 205 of the messaging application 135 that is initiating the conversation may determine the randomness, or vice versa.

As described above, the randomness and or the threshold values may be determined at the beginning of the conversation. Alternatively, the randomness and/or the threshold value may be periodically re-determined by the initialization engine 205 throughout the conversation. For example, after each summary 125 is transmitted, a new randomness may be determined. In other examples, the threshold value may be changed when the error $\epsilon$ changes, or if the number of detected errors in the messages 115 exceeds or falls below an expected number of errors.

The verification engine 210 may generate a summary 125 after the number of messages 115 in the conversation has reached the threshold value. Depending on the implementation, the verification engine 210 may generate the summary 125 using a hash function, the randomness, and a transcript 235. The transcript 235 may be a list or concatenation of the messages 115 sent or received by the messaging application 135 since the beginning or since the last summary was generated. The transcript 235 may include a plurality of positions and each position may correspond to a message 115. The positions in the transcript 235 may be ordered based on a time associated with each message 115 for example by the time at which the message 115 was sent and/or received by the messaging application 135.

Depending on the implementation, the verification engine 210 may generate the summary 125 from the transcript 235, and may send the generated summary 125 to the messaging application 135 that is participating in the conversation. In addition, other information may be included with the summary 125, such as the randomness used with the hash function, and the length of the transcript 235 used to generate the summary 125.

As described previously, when the generated summary 125 does not match the received summary 125, the messaging application 135 may roll-back the conversation and transcript 235 to an earlier point and continue from there to send new messages 115 that are covered by a new summary 125.

Alternatively, to avoid rolling-back too far and resending many messages 115 covered by the summary 125 that were already correct, the messaging applications 135 may reduce the roll-back using what are referred to herein as meeting positions. Each meeting position may be a position within the transcript 235. The number of meeting positions may be two, but more meeting positions may be used. The number and value of the meeting positions may be determined by the initialization engine 205.

In such implementations, the verification engine 210 may generate a sub-transcript 245 of the transcript 235 for each meeting position. Each sub-transcript 245 may include each message 115 from the transcript 235 up until the meeting position. The verification engine 210 may then generate a summary 125 for each of the sub-transcripts 245, and may transmit the summaries 125 of the sub-transcripts 245 along with the summary 125 of the transcript 235.

When the generated summary 125 of the transcript 235 is compared with a received summary 125 of a transcript 235, if the summaries 125 do not agree, the summaries 125 of the sub-transcripts 245 can be compared to determine if there is a sub-transcript 245 where the summaries 125 agree, indicating that there are no errors in the messages 115 associated with the sub-transcript 245. Accordingly, at most the messages 115 from the transcript 235 that are after the meeting position of the sub-transcript 245 may be rolled-back.

In some implementations, the value of the meeting positions may be based on a verification value k. The value k may be initially set to 1 by the verification engine 210, but may be increased after subsequent unsuccessful rounds (i.e., summary disagreements) of the algorithm. In addition, the value k may be reset to 1 after some number of unsuccessful roll-back attempts. The values of k for each of the messaging application 135 may be transmitted along with the summaries 125.

The computation engine 215 may receive the summary 125 (or summaries 125 depending on the implementation) from a messaging application 135, and may determine whether the summary 125 is the same (i.e., equals) the summary 125 generated by the verification engine 210.

In implementations where only a summary 125 of the transcript 235 is generated and transmitted, the computation engine 215 may compare the received summary with the generated summary. If they are the same, then the computation engine 215 may determine that there are no errors associated with the messages 115 of the transcript 235. Accordingly, the computation engine 215 may commit the messages 115, and may cause any computations associated with the messages 115 to be performed, for example.

If the summaries 125 are not equal, the computation engine 215 may indicate that the summaries 125 are not equal to the transition engine 225. As described further below, the transition engine 225 may roll-back to an earlier position in the transcript 235.

In implementations using meeting positions, after the computation engine 215 determines that received summary 125 of the transcript 235 does not equal the generated summary 125, the computation engine 215 may consider the summaries of the sub-transcripts 245. In addition, the computation engine 215 may increment a count of the number of matching summaries 125 of sub-transcripts 245 that have been observed so far.

In implementations using two meeting positions, the computation engine 215 may determine if a first generated summary of a sub-transcript 245 (i.e., the first meeting position) equals any of the received summaries of the sub-transcripts. If it does, the computation engine 215 may indicate to the transition engine 225 that the first meeting position is associated with a matching summary. Alternatively or additionally, the computation engine 215 may increment a variable associated with the first meeting position.

If the first generated summary of a sub-transcript 245 does not equal any of the received summaries of sub-transcripts, the computation engine 215 may consider a second generated summary 125 of a sub-transcript 245 (i.e., the second meeting position). If the second generated summary 125 equals any of the received summaries of the sub-transcripts, the computation engine 215 may indicate to the transition engine 225 that the second meeting position is associated with a matching summary 125. Alternatively or additionally, the computation engine 215 may increment a variable associated with the second meeting position.

The transition engine 225 may roll-back the messages 115 sent and received by the messaging application 135. In implementations where no meeting positions are used, the transition engine 225 may roll-back the messages 115 by having the messaging application 135 with the longer transcript roll-back a number of messages 115 from the transcript 235 proportional to the threshold value. The corresponding transition engine 225 of the other messaging application that is a party to the conversation may act similarly.

In implementations with meeting positions, the transition engine 225 may receive the indication of a matching meeting position from the computation engine 215, and may roll-back the messages from the transcript 235 that are after the indicated meeting position. The corresponding transition engine 225 of the other messaging application 135 that is a party to the conversation may perform a similar roll-back.

In other implementations, the transition engine 225 may compare the count of the number of non-matching summaries 125 that have been observed so far to a threshold. If the count is above the threshold, then the transition engine 225 may determine to reset the variables associated with the first and second meeting positions, the count of the non-matching summaries, and the value of k to zero. Depending on the implementation, the threshold count may be based on the value of k. For example, the threshold count may be half of k. Other values or thresholds may be used.

The transition engine 225 may determine if the value of the variable associated with the first meeting position is above a threshold. If it is above the threshold, then the transition engine 225 may cause the messaging application 135 to roll-back the messages from the transcript 235 that are after the first meeting position. In some implementations, the threshold may be based on the value of k. For example, the threshold may be a fraction of k such as 0.4 k. Other fractions or thresholds may be used.

Otherwise, the transition engine 225 may determine if the value of the variable associated with the second meeting position is above the threshold. If it is above the threshold, then the transition engine 225 may cause the messaging application 135 to roll-back the messages from the transcript 235 that are after the second meeting position.

In addition, if either of the values of the variables associated with the first or second meeting positions are above the threshold, the transition engine 225 may reset the variables associated with the first and second meeting positions, the count of the non-matching summaries, and the value of k to zero.

Figure 3:
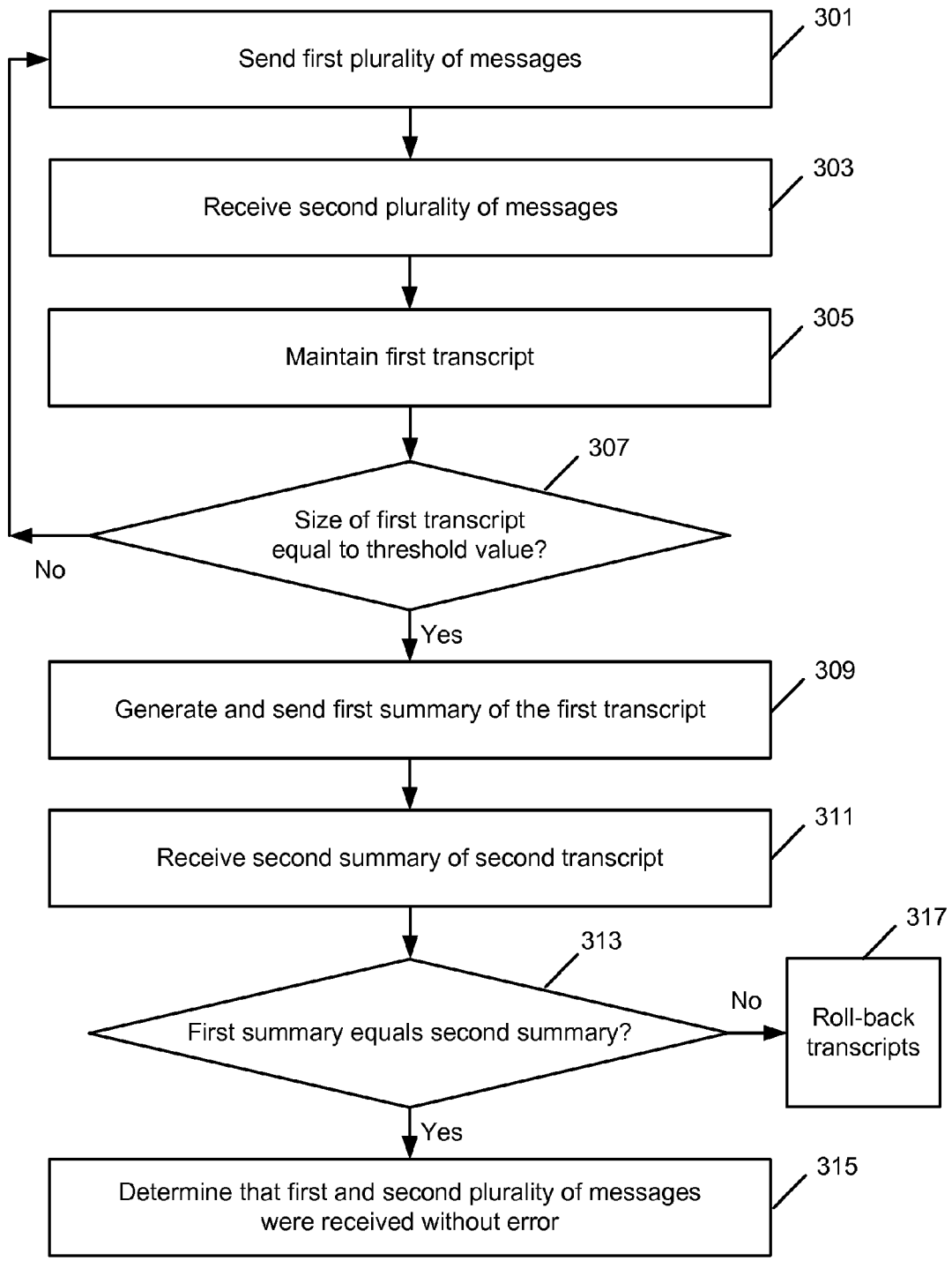
FIG. 3 is an illustration of an operational flow of a method for determining whether any errors are associated with either a first or second plurality of messages, and if so, resending the first and second plurality of messages.

FIG. 3 is an illustration of an operational flow of a method 300 for determining whether any errors are associated with either a first or second plurality of messages, and if so, resending the first and second plurality of messages. The method 300 may be implemented by a messaging application 135, for example.

At 301, a first plurality of messages is sent. The first plurality of messages 115 may be sent by a messaging application 135 of a first computing device to a messaging application 135 of a second computing device. The first plurality of messages may be part of a conversation between the messaging applications 135. The messages 115 may be a variety of message types including text messages, for example. Each message may include one or more bits or bytes, and may include characters from a variety of alphabets and/or symbol sets. The messages 115 may be instructions in a computer program, for example.

At 303, a second plurality of messages is received. The second plurality of messages may be received by the messaging application of the first computing device from the messaging application of the second computing device. The second plurality of messages may be part of the conversation associated with the first plurality of messages.

At 305, a first transcript is maintained. The first transcript 235 may be maintained by the messaging application 135. In some implementations, the first transcript 235 may be a record of all of the messages 115 received and sent by the messaging application of the first computing device. The transcript 235 may include a list, with a position for each message 115. The messages 115 may be ordered in the transcript 235 based on the time when the messages were either sent or received by the messaging application. The messaging application of the second computing device may similarly maintain a second transcript based on the messages sent and received by the messaging application of the second computing device.

At 307, whether the size of the transcript is equal to a threshold value is determined. The threshold value may represent the maximum number of messages 115 that may be exchanged in the conversation before the summaries 125 are exchanged between the messaging applications to determine that all of the messages were sent and received without errors. The threshold value may be a default or predetermined value, or may be selected by either the first or second computing device based on conditions of a channel being used to send and receive the messages. If the size of the transcript is not the threshold value, then the messaging application 135 may return to 301 where messages 115 may be continued to be sent and received by the messaging application 135 of the first computing device. Otherwise, the messaging application continues at 309.

At 309, a first summary of the first transcript is generated and sent by the first computing device. The first summary 125 may be generated by the messaging application of the first computing device and sent to the corresponding messaging application of the second computing device. The first summary may be generated from the first transcript by the messaging application using a hash function and randomness. Depending on the implementation, the randomness may be selected by one or both of the first and second computing devices. The randomness used to generate the first summary may be sent with the first summary, along with other auxiliary information such as the length of the first transcript.

At 311, a second summary of the second transcript is received. The second summary may be received by the messaging application of the first computing device, and may have been generated and sent by the corresponding messaging application of the second computing device. The second summary may have been generated from the second transcript that is maintained by the messaging application of the second computing device. The second summary may have been generated by the second computing device using the same randomness and hash function that was used by the first computing device to generate the first summary.

At 313, whether the first summary is equal to the second summary is determined. The determination may be made by the messaging application of the first computing device. If the first summary is equal to the second summary, then the messaging application continues at 315. Otherwise, the messaging application continues at 317.

At 315, it is determined that the first and second plurality of messages were sent and received without error. Because the first summary was found to equal the second summary, the messaging application of the first computing device can determine that both the first and second computing devices agree on the messages that were sent and received. Accordingly, the first plurality and the second plurality of messages may be committed or entered by the messaging application.

At 317, the conversation and the transcripts are rolled-back. The conversations and transcripts may be rolled back to before the first and the second plurality of messages were sent. Depending on the implementations, the transcripts may be rolled back by resending some or all of the first and the second plurality of messages.

Figure 4:
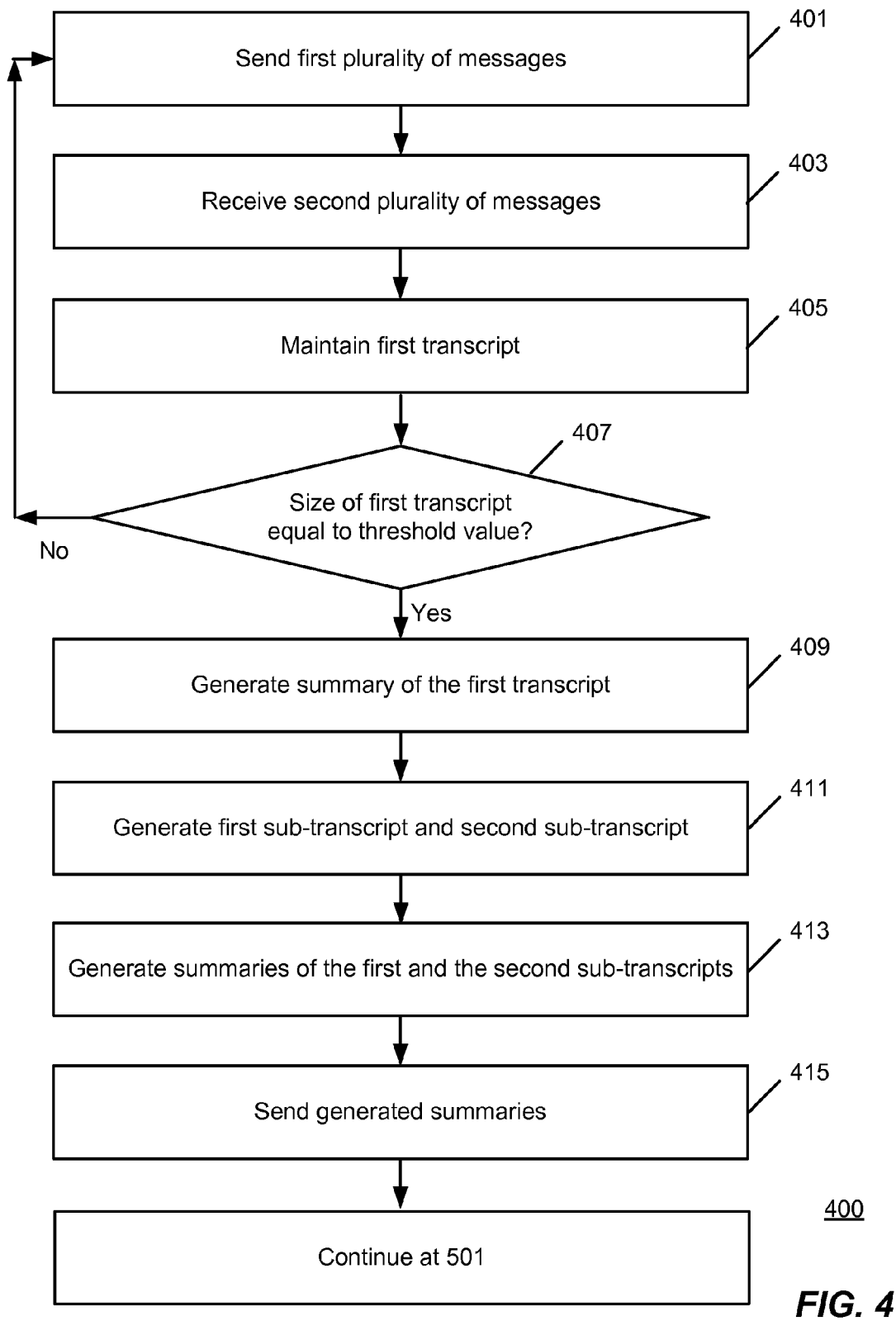
FIG. 4 is an operational flow of an implementation of a method for generating and sending summaries of transcripts and sub-transcripts according to one or more meeting positions.

FIG. 4 is an operational flow of an implementation of a method 400 for generating and sending summaries of transcripts and sub-transcripts according to one or more meeting positions. The method 400 may be implemented by the messaging application 135.

At 401, a first plurality of messages is sent. The first plurality of messages 115 may be sent by a messaging application 135 of a first computing device to a messaging application 135 of a second computing device. The first plurality of messages may be part of a conversation between the messaging applications 135.

At 403, a second plurality of messages is received. The second plurality of messages may be received by the messaging application of the first computing device from the messaging application of the second computing device. The second plurality of messages may be part of the conversation associated with the first plurality of messages.

At 405, a first transcript is maintained. The first transcript 235 may be maintained by the messaging application. In some implementations, the first transcript may be a record of all of the messages received and sent by the messaging application of the first computing device. The transcript may include a list, with a position for each message. The messages may be ordered in the transcript based on the time when the messages were either sent or received by the messaging application. The messaging application of the second computing device may similarly maintain a second transcript based on the messages sent and received by the messaging application of the second computing device.

At 407, it is determined whether the size of the first transcript is equal to a threshold value. If the size of the transcript is not the threshold value, then the messaging application 135 may return to 401 where messages 115 may be continued to be sent and received by the messaging application of the first computing device. Otherwise, the messaging application 135 continues at 409.

At 409, a summary of the first transcript is generated. The summary 125 of the first transcript may be generated by the messaging application 135 using a hash function.

At 411, a first sub-transcript and a second sub-transcript are generated. The first and second sub-transcripts may be generated from the first transcript 235. Each of the first and second sub-transcripts 245 may be associated with a meeting position. A meeting position is a position or identifier of a message in the first transcript that is a cut-off point for the associated sub-transcript 245. Thus, the first sub-transcript includes all messages from the first transcript that are before a first meeting position, and the second sub-transcript includes all messages from the first transcript that are before a second meeting position. The second meeting position may be associated with a time that is earlier than the first meeting position. By using meeting positions the first computing device may be able to avoid resending too many of the messages covered by the first transcript in the event that there is an error detected.

At 413, summaries of the first and second sub-transcripts are generated. The summaries 125 may be generated by the messaging application of the first computing device from the sub-transcripts using the same hash function used to generate the summary of the first transcript.

At 415, the generated summaries are sent. The generated summary of the first transcript, the generated summary of the first sub-transcript, and the generated summary of the second sub-transcript may be sent by the messaging application of the first computing device to the corresponding messaging application of the second computing device. Depending on the implementation, the generated summaries may be sent along with randomness used by the hash function, a value k used by the messaging application to select the first and second meeting positions and a length of the first transcript, for example.

After sending the generated summaries, the messaging application continues at 501 of the method 500 where the generated summaries may be compared with one or more received summaries from the corresponding messaging application of the second computing device.

Figure 5:
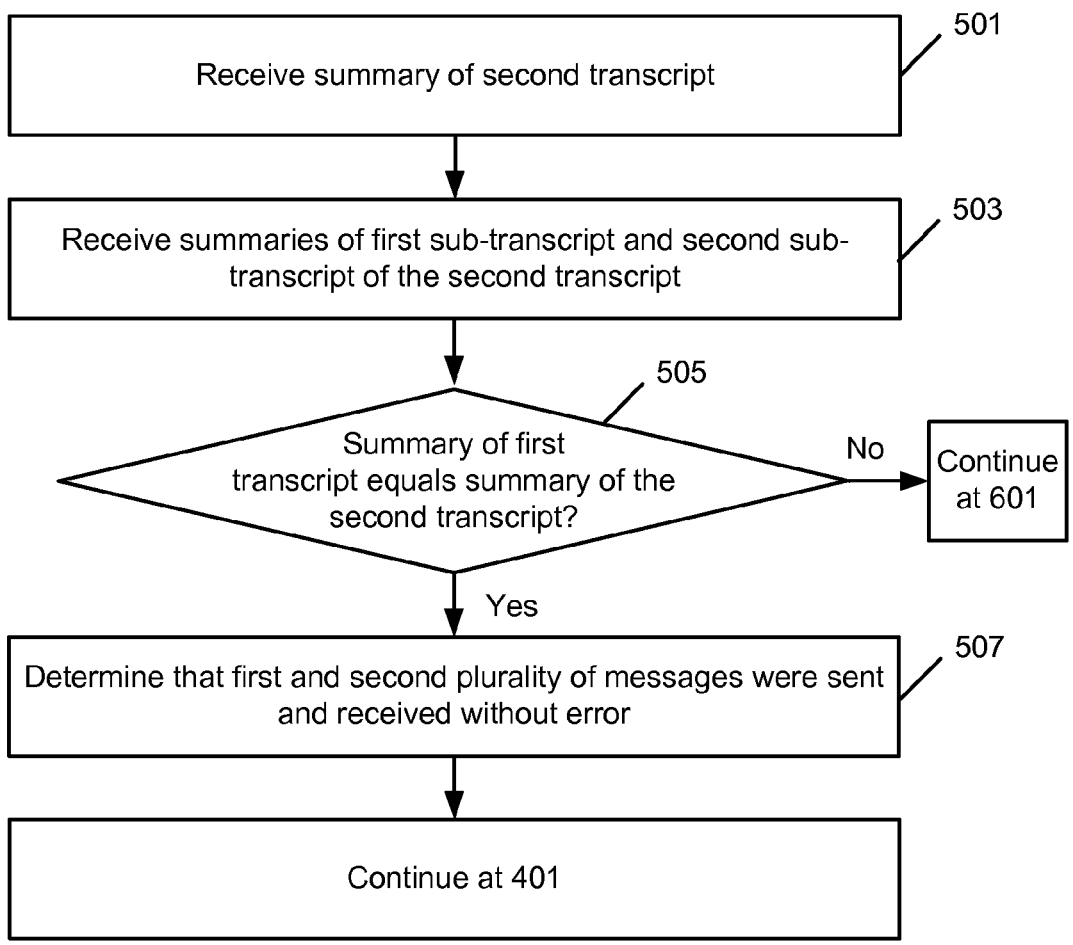
FIG. 5 is an operational flow of an implementation of a method for receiving generated summaries and comparing the generated summaries to determine if there are any errors associated with one or more messages.

FIG. 5 is an operational flow of an implementation of a method 500 for receiving generated summaries and comparing the generated summaries to determine if there are any errors associated with one or more messages. The method 500 may be implemented by a messaging application 135.

At 501, a summary of a second transcript is received. The summary of a second transcript may be received by the messaging application of a first computing device from a corresponding messaging application of a second computing device. The second transcript may be based on the messages sent and received by the messaging application of the second computing device.

At 503, summaries of a first sub-transcript of the second transcript and a second sub-transcript of the second transcript are received. The summaries may be received by the messaging application of the first computing device from the corresponding messaging application of the second computing device. The first sub-transcript of the second transcript may correspond to the first meeting position, and the second sub-transcript of the second transcript may correspond to the second meeting position.

It is determined at 505 whether the summary of the first transcript equals the received summary of the second transcript. The determination may be made by the messaging application of the first computing device. The summary of the first transcript was generated by the first computing device, and the summary of the second transcript was generated by the second computing device. If the summaries are equal, then the messaging application continues at 507. Otherwise, the messaging application continues at 601 of the method 600 where the conversation may be rolled-back to an earlier point.

At 507, it is determine that the first and second plurality of messages were sent and received without error. Because the summary of the first transcript was found to equal the summary of the second transcript, the messaging application of the first computing device is assured that both the first and second computing devices agree on the messages that were sent and received. Accordingly, the first plurality and the second plurality of messages may be committed or entered by the messaging application. The messaging application may then return to 401 where another first plurality of messages may be sent to the second computing device.

Figure 6:
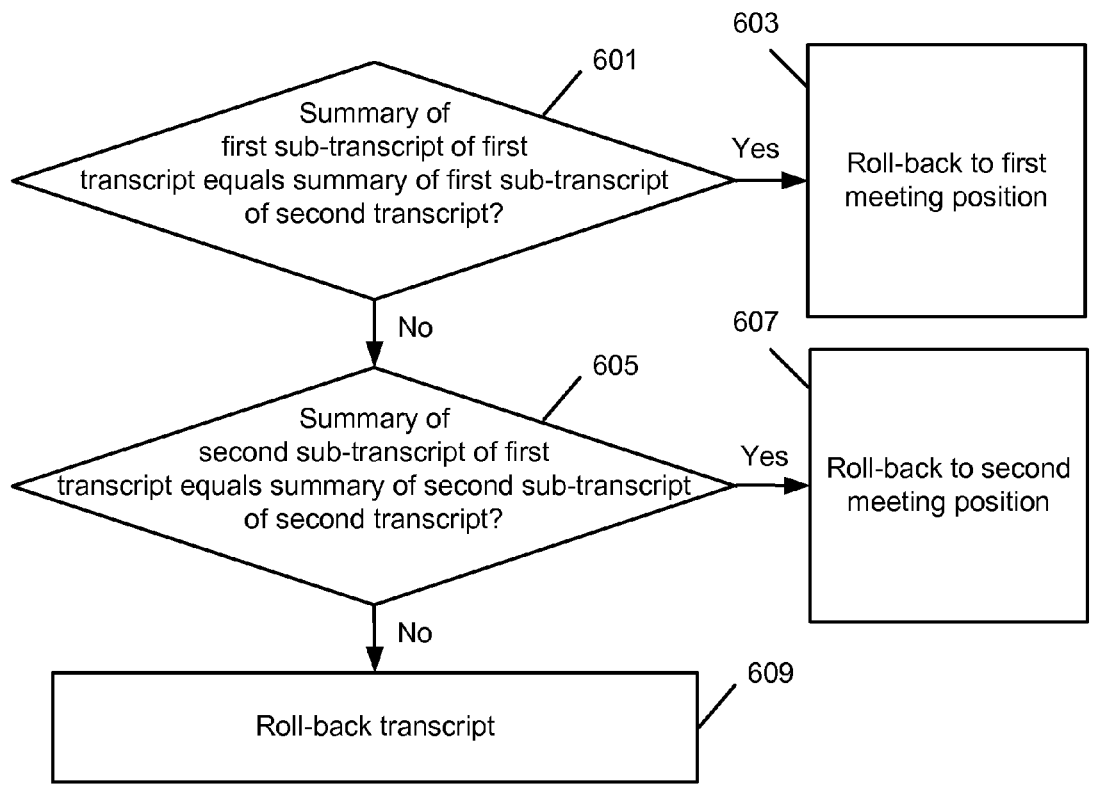
FIG. 6 is an operational flow of an implementation of a method for rolling-back a conversation.

FIG. 6 is an operational flow of an implementation of a method 600 for rolling-back a conversation. The method 600 may be implemented by a messaging application 135.

At 601, it is determined whether the summary of the first sub-transcript of the first transcript equals the summary of the first sub-transcript of the second transcript. If the summaries are equal, the messaging application continues at 603. Otherwise, the messaging application continues at 605.

At 603, the conversation is rolled-back to the first meeting position. Depending on the implementation, the messaging application may roll-back the conversation by sending messages from the first plurality of messages that were sent after the first meeting position. The messages may be sent by the messaging application of the first computing device to the corresponding messaging application of the second computing device. The sent messages may be those messages that have a slot or position that is after the first meeting position in the first transcript.

At 605, it is determined whether the summary of the second sub-transcript of the first transcript equals the summary of the second sub-transcript of the second transcript. If the summaries are equal, the messaging application continues at 607. Otherwise, the messaging application continues at 609.

At 607, the conversation is rolled-back to the second meeting position. Depending on the implementation, the messaging application may roll-back the conversation by sending messages from the first plurality of messages that were sent after the second meeting position. The messages may be sent by the messaging application of the first computing device to the corresponding messaging application of the second computing device. The sent messages may be those messages that have a slot or position that is after the second meeting position in the first transcript.

At 609, the conversation and the transcripts are rolled-back. The conversations and transcripts may be rolled-back to before the first and the second plurality of messages were sent. Depending on the implementations, the transcripts may be rolled-back by resending some or all of the first and the second plurality of messages. The first plurality of messages may be resent by the messaging application of the first computing device to the corresponding messaging application of the second computing device. Because none of the summaries of the sub-transcripts matched, the messaging application cannot roll-back to either later meeting position.

Figure 7:
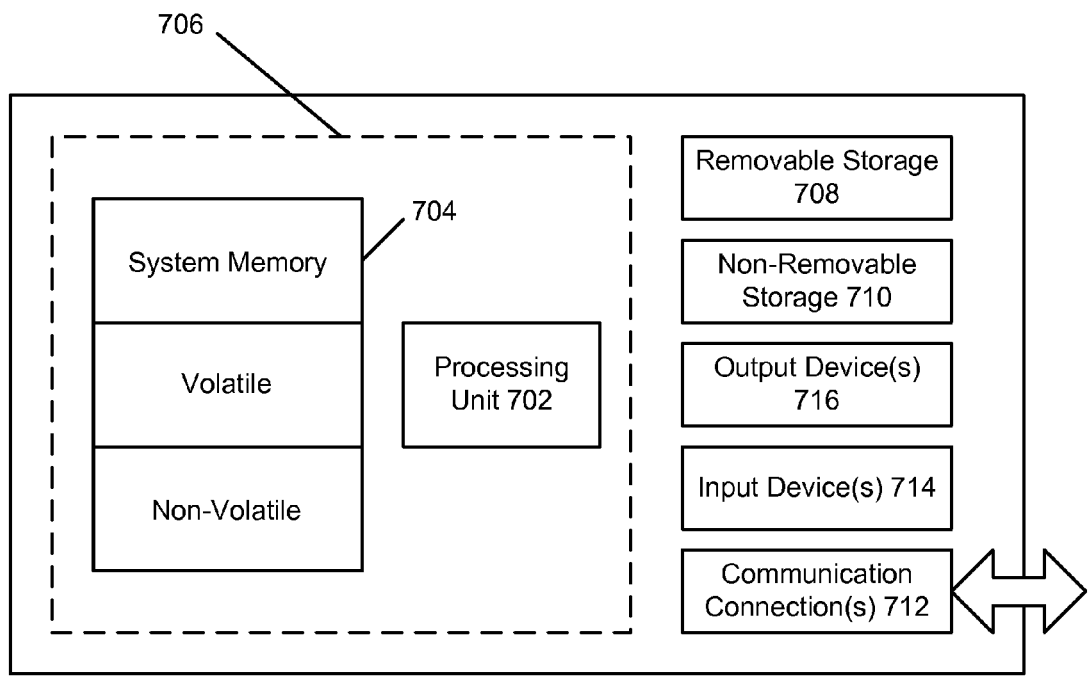
FIG. 7 shows an exemplary computing environment in which example embodiments and aspects may be implemented.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    sending a first plurality of messages by a first computing device to a second computing device;
    receiving a second plurality of messages by the first computing device from the second computing device;
    maintaining a first transcript of the first plurality of messages and the second plurality of messages by the first computing device;
    generating a first summary of the first transcript by the first computing device;
    receiving a second summary of a second transcript by the first computing device from the second computing device, wherein each transcript has a plurality of ordered positions and each message of the first plurality of messages and the second plurality of messages is associated with a position of the plurality of ordered positions in each transcript;
    determining that the first summary does not equal the second summary by the first computing device;
    in response to the determination that the first summary does not equal the second summary, rolling-back a current position of the plurality of ordered positions of the first transcript to an earlier position of the plurality of ordered positions of the first transcript by the first computing device; and
    resending one or more messages from the first plurality of messages that are associated with positions of the plurality of ordered positions of the first transcript that are the same or after the earlier position in the first transcript by the first computing device.

2. The method of claim 1, further comprising:
    determining that the first summary equals the second summary by the first computing device; and
    in response to the determination that the first summary equals the second summary, assuming that no errors are associated with the first plurality of messages and the second plurality of messages by the first computing device.

3. The method of claim 1, wherein rolling-back the current position of the plurality of ordered positions of the first transcript to the earlier position of the plurality of ordered positions of the first transcript comprises
  determining the earlier position of the plurality of ordered positions where a summary of the first transcript that includes only the messages associated with positions that are before the determined earlier position is equal to the received second summary; and
  rolling-back the current position to the determined earlier position.

4. The method of claim 1, wherein the first plurality of messages is sent without error correcting codes.

5. The method of claim 1, further comprising:
  determining that a number of messages in the first plurality of messages and the second plurality of messages equal a threshold value; and
  generating the first summary in response to the determination that the number of messages in the first plurality of messages equal the threshold value.

6. The method of claim 1, wherein the first summary is a hash value.

7. The method of claim 6, further comprising exchanging randomness with the second computing device, and generating the first summary using the exchanged randomness and a hash function.

8. A method comprising:
  sending a first plurality of messages by a first computing device to a second computing device;
  receiving a second plurality of messages by the first computing device from the second computing device;
  maintaining a first transcript of the first plurality of messages and the second plurality of messages by the first computing device, wherein the first transcript has a plurality of ordered positions and each message of the first plurality of messages and the second plurality of messages is associated with a position of the plurality of ordered positions in the first transcript;
  generating a summary of the first transcript by the first computing device;
  generating a first sub-transcript from the first transcript by the first computing device, wherein the first sub-transcript includes positions of the first transcript up to a first meeting position;
  generating a summary of the first sub-transcript of the first transcript by the first computing device;
  receiving a summary of a second transcript by the first computing device from the second computing device;
  receiving a summary of a first sub-transcript of the second transcript by the first computing device from the second computing device, wherein the first sub-transcript of the second transcript includes positions of the second transcript up to the first meeting position;
  determining that the summary of the first transcript does not equal the summary of the second transcript by the first computing device;
  in response to the determination that the summary of the first transcript does not equal the summary of the second transcript, rolling-back a current position of the plurality of ordered positions of the first transcript to a position that is the same or after the first meeting position of the plurality of ordered positions of the first transcript by the first computing device; and
  resending one or more messages from the first plurality of messages that are associated with positions of the plurality of ordered positions of the first transcript that are the same or after the first meeting position of the plurality of ordered positions of the first transcript by the first computing device.

9. The method of claim 8, further comprising:
  determining that the summary of the first transcript equals the summary of the second transcript by the first computing device; and
  in response to the determination, assuming that no errors are associated with the first plurality of messages and the second plurality of messages by the first computing device.

10. The method of claim 8, further comprising determining that the summary of the first sub-transcript of the first transcript equals the summary of the first sub-transcript of the second transcript, and in response to the determination, rolling-back the current position in the first transcript to the position that is the same or after the first meeting position.

11. The method of claim 8, further comprising:
  generating a second sub-transcript from the first transcript by the first computing device, wherein the second sub-transcript includes positions of the first transcript up to a second meeting position, wherein the second meeting position is different than the first meeting position;
  generating a summary of the second sub-transcript of the first transcript by the first computing device; and
  receiving a summary of a second sub-transcript of the second transcript by the first computing device from the second computing device, wherein the second sub-transcript of the second transcript includes positions of the second transcript up to the second meeting position.

12. The method of claim 11, further comprising determining that the summary of the second sub-transcript of the first transcript equals the summary of the second sub-transcript of the second transcript, and in response to the determination, rolling-back the current position to the position in the first transcript that is the same or after the second meeting position.

13. The method of claim 8, further comprising:
  determining that a number of messages in the first plurality of messages and the second plurality of messages equal a threshold value; and
  generating the summary of the first transcript in response to the determination.

14. The method of claim 8, wherein the summary of the first transcript comprises a hash value.

15. The method of claim 8, further comprising exchanging randomness with the second computing device, and generating the summary of the first transcript using the exchanged randomness and a hash function.

16. A system comprising:
  a first computing device comprising a processor and memory; and
  a messaging application adapted to:
    send a plurality of messages to a second computing device;
    maintain a first transcript of the plurality of messages;
    generate a first summary of the first transcript;
    receive a second summary of a second transcript from the second computing device, wherein the each transcript has a plurality of ordered positions and each message of the plurality of messages is associated with a position of the plurality of ordered positions in each transcript;
    determine that the first summary does not equal the second summary;

in response to the determination that the first summary does not equal the second summary, roll-back a current position of the plurality of ordered positions of the first transcript to an earlier position of the plurality of ordered positions of the first transcript; and resend one or more messages from the plurality of messages that are associated with positions of the plurality of ordered positions of the first transcript that are the same or after the earlier position in the first transcript.

17. The system of claim 16, wherein the messaging application is further adapted to:
determine that the first summary equals the second summary; and
in response to the determination that the first summary equals the second summary, assume that no errors are associated with the plurality of messages.

18. The system of claim 16, wherein the messaging application is further adapted to:
determine that a number of messages in the plurality of messages equal a threshold value; and
generate the first summary in response to the determination that the number of messages in the plurality of messages equal the threshold value.

* * * * *